United States Patent
Mhaske (10) Patent No.: US 11,438,382 B1
(45) Date of Patent: Sep. 6, 2022

(54) SYSTEMS AND METHODS FOR INCREASING CYBERSECURITY PROTECTION

(71) Applicant: Symantec Corporation, Mountain View, CA (US)

(72) Inventor: Sharad Mhaske, Maharashtra (IN)

(73) Assignee: NortonLifeLock Inc., Tempe, AZ (US)

(*) Notice: Subject to any disclaimer, the term of this patent is extended or adjusted under 35 U.S.C. 154(b) by 356 days.

(21) Appl. No.: 16/287,070

(22) Filed: Feb. 27, 2019

(51) Int. Cl.
*H04L 9/40* (2022.01)

(52) U.S. Cl.
CPC ........ *H04L 63/20* (2013.01); *H04L 63/1433* (2013.01)

(58) Field of Classification Search
CPC ........................... H04L 63/02; H04L 63/1433
USPC ........................................................ 726/22
See application file for complete search history.

(56) References Cited

U.S. PATENT DOCUMENTS

| | | | |
|---|---|---|---|
| 11,140,179 B1* | 10/2021 | Infante-Lopez | G06F 16/9024 |
| 2010/0267405 A1* | 10/2010 | Chin | H04W 48/12 455/500 |
| 2019/0036871 A1* | 1/2019 | Lapidous | H04L 63/0281 |
| 2019/0385134 A1* | 12/2019 | Keen | G06Q 20/407 |

* cited by examiner

*Primary Examiner* — Anthony D Brown
(74) *Attorney, Agent, or Firm* — FisherBroyles, LLP (57) ABSTRACT

The disclosed computer-implemented method for increasing cybersecurity protection may include (i) receiving, at a subscription-management computing device, an alert indication that indicates (A) a cybersecurity status score on a protected computing device is lower than a threshold value and (B) the protected computing device is associated with an expired subscription to a cybersecurity service and (ii) performing, responsive to receiving the alert indication, a security action comprising sending, from the subscription-management computing device to a server, a transfer instruction directing the server to transfer, to the protected computing device, at least a portion of a duration of a valid subscription to the cybersecurity service. Various other methods, systems, and computer-readable media are also disclosed.

20 Claims, 6 Drawing Sheets

SYSTEMS AND METHODS FOR INCREASING CYBERSECURITY PROTECTION

BACKGROUND

Cybersecurity protection may be provided to specific computing devices on a time-limited subscription basis by cybersecurity services. When the subscriptions expire, cybersecurity protection for associated computing devices may be reduced or completely eliminated, which renders the associated computing devices under-protected.

Recent innovations in computing devices are increasing numbers of computing devices that users own and want to protect. Thus, users often purchase subscriptions that protect limited numbers of devices (e.g., up to five devices). However, when users subsequently want to add additional devices, valid subscriptions may already cover maximum permitted numbers of devices and may not be available to protect the additional devices. Some users may purchase new subscriptions to protect the additional devices, resulting in users owning multiple subscriptions having partially-overlapping coverage dates. Thus, to maintain continuing protection, users must track which computing devices are covered by specific subscriptions and related subscription expiration dates. When users are not vigilant about maintaining continuing cybersecurity protection, computing devices may become unprotected and thus vulnerable to cyberattacks. The instant disclosure, therefore, identifies and addresses a need for systems and methods for increasing cybersecurity protection.

SUMMARY

As will be described in greater detail below, the instant disclosure describes various systems and methods for increasing cybersecurity protection.

In one example, a method for increasing cybersecurity protection may include (i) receiving, at a subscription-management computing device, an alert indication that indicates (A) a cybersecurity status score on a protected computing device is lower than a threshold value and (B) the protected computing device is associated with an expired subscription to a cybersecurity service and (ii) performing, responsive to receiving the alert indication, a security action including sending, from the subscription-management computing device to a server, a transfer instruction directing the server to transfer, to the protected computing device, at least a portion of a duration of a valid subscription to the cybersecurity service.

In one example, the method may include performing the security action automatically in response to receiving the alert indication.

In some embodiments, method may include (i) displaying, on a user interface of the subscription-management computing device and responsive to receiving the alert indication, a request to authorize sending the transfer instruction and (ii) receiving, from the user interface of the subscription-management computing device, an authorization instruction directing sending the transfer instruction. In some examples, method may include limiting a number of repetitions of sending the transfer instruction to a specified maximum quantity. In an embodiment, method may include displaying, responsive to the number of transfer instructions equaling or surpassing the specified maximum quantity, a request on a user interface of the subscription-management computing device to renew the expired subscription to the cybersecurity service associated with the protected computing device.

In one example, the transfer instruction may describe a number of days, remaining in the valid subscription, to transfer to the protected computing device.

In some embodiments, method may include performing the security action in response to the protected computing device being within range of a wireless transmitter of the subscription-management computing device.

In some examples, the transfer instruction may direct the server to send a token to the protected computing device to enable the protected computing device to download the cybersecurity service.

In an embodiment, method may include displaying, responsive to receiving the alert indication and on a user interface of the subscription-management computing device, a request to renew the expired subscription of the protected computing device.

In one example, method may include displaying, responsive to receiving the alert indication and on a user interface of the subscription-management computing device, a request to renew the valid subscription.

In some embodiments, method may include (i) receiving, at the server, the transfer instruction and (ii) sending, from the server to the protected computing device and responsive to the transfer instruction, information enabling the protected computing device to use the duration of the valid subscription to the cybersecurity service. In some examples, method may include (i) receiving, at the protected computing device, the information enabling the protected computing device to use the at least the portion of the duration of the valid subscription to the cybersecurity service and (ii) providing, using the cybersecurity service and responsive to the receiving the information enabling the protected computing device to use the at least the portion of the duration of the valid subscription to the cybersecurity service, the protected computing device with cybersecurity protection.

In one embodiment, a system for increasing cybersecurity protection may include a subscription-management computing device including at least one physical processor and physical memory that includes computer-executable instructions that, when executed by the physical processor, cause the physical processor to (i) receive, at the subscription-management computing device, an alert indication that indicates (A) a cybersecurity status score on a protected computing device is lower than a threshold value and (B) the protected computing device is associated with an expired subscription to a cybersecurity service and (ii) perform, responsive to receiving the alert indication, a security action including sending, from the subscription-management computing device to a server, a transfer instruction directing the server to transfer, to the protected computing device, at least a portion of a duration of a valid subscription to the cybersecurity service.

In some examples, the above-described method may be encoded as computer-readable instructions on a non-transitory computer-readable medium. For example, a computer-readable medium may include one or more computer-executable instructions that, when executed by at least one processor of a subscription-management computing device, may cause the subscription-management computing device to (i) receive, at the subscription-management computing device, an alert indication that indicates (A) a cybersecurity status score on a protected computing device is lower than a threshold value and (B) the protected computing device is associated with an expired subscription to a cybersecurity service and (ii) perform, responsive to receiving the alert indication, a security action including sending, from the subscription-management computing device to a server, a transfer instruction directing the server to transfer, to the protected computing device, at least a portion of a duration of a valid subscription to the cybersecurity service.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for increasing cybersecurity protection. As will be explained in greater detail herein, in some examples the systems described herein may enable automatically transferring at least a portion of a duration of a valid subscription to cybersecurity protection from a first computing device (e.g., a subscription-management computing device) to a second computing device (e.g., a protected computing device) based on cybersecurity status (e.g., vulnerability) of the second computing device.

The following non-limiting example is provided for ease of understanding. In an example, two subscriptions to a cybersecurity service each cover five computing devices. One of the subscriptions has a three-year duration and the other subscription has a one-year duration. When the annual subscription expires, the installed cybersecurity protection only offers minimal free features (e.g., malware detecting) and does not provide advanced protection features (e.g., ransomware protection). The provided techniques compute a cybersecurity status score for a computing device, even when a subscription protecting that computing device has expired. When the cybersecurity status score passes a threshold value (e.g., drops below the threshold value), at least a portion of the remaining duration of the unexpired three-year subscription may be automatically transferred to protect the computing device having the expired one-year subscription. In some examples, a user display on a computing device protected by the three-year subscription may indicate that the transfer will be made at a certain time, the transfer is pending, and/or the transfer is complete. In some embodiments, the computing device protected by the three-year subscription may receive a user input indicating a specific duration of the valid subscription to transfer to a specific computing device having the expired subscription. The transfer thus increases cybersecurity protection of the computing device receiving the transferred duration of the valid subscription. In some examples, a number of transfers may be limited to a specific numerical limit. Once the number of transfers reaches the limit, subscription transfer features are not available without renewing at least one of the subscriptions.

By doing so, the systems and methods described herein may improve functioning of computing devices, improve cybersecurity protection provided to computing devices, and/or provide targeted protection against malware, and thus improve fields of malware protection in general, by providing a method for automatically increasing cybersecurity protection of computing devices. Examples of the provided techniques improve a state of security of computing devices, potentially resulting in significant time and/or monetary savings. Further, systems and methods described herein may beneficially reduce and/or eliminate gaps in time during which computing devices have reduced levels of cybersecurity protection, when compared to other techniques. In some examples, the provided systems and methods may improve functioning of protected computing devices by providing increased cybersecurity protection to the protected computing devices. Thus, disclosed systems and methods may provide protection for common targets of malware.

Figure 1:
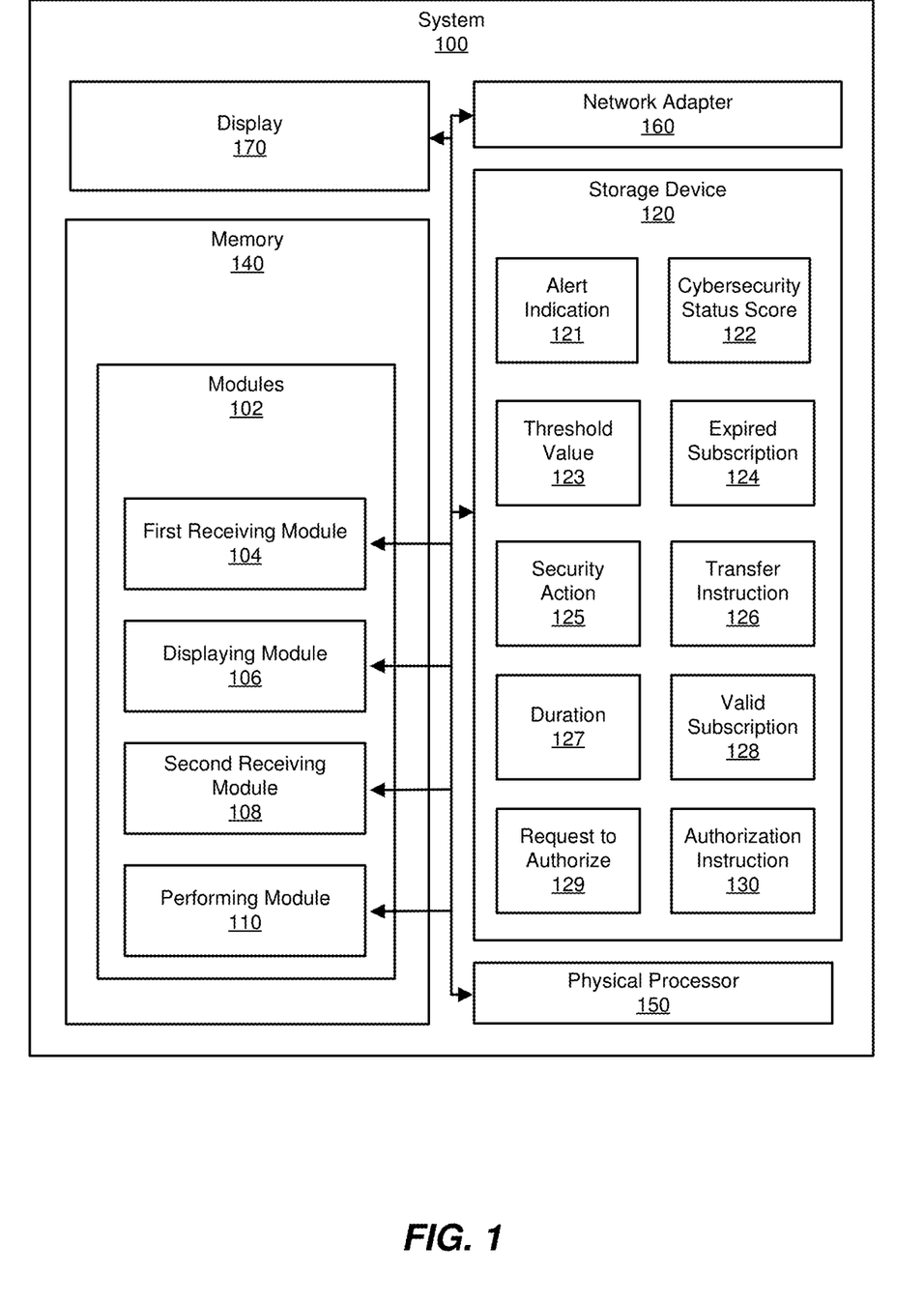
FIG. 1 is a block diagram of an example system for increasing cybersecurity protection.
Figure 2:
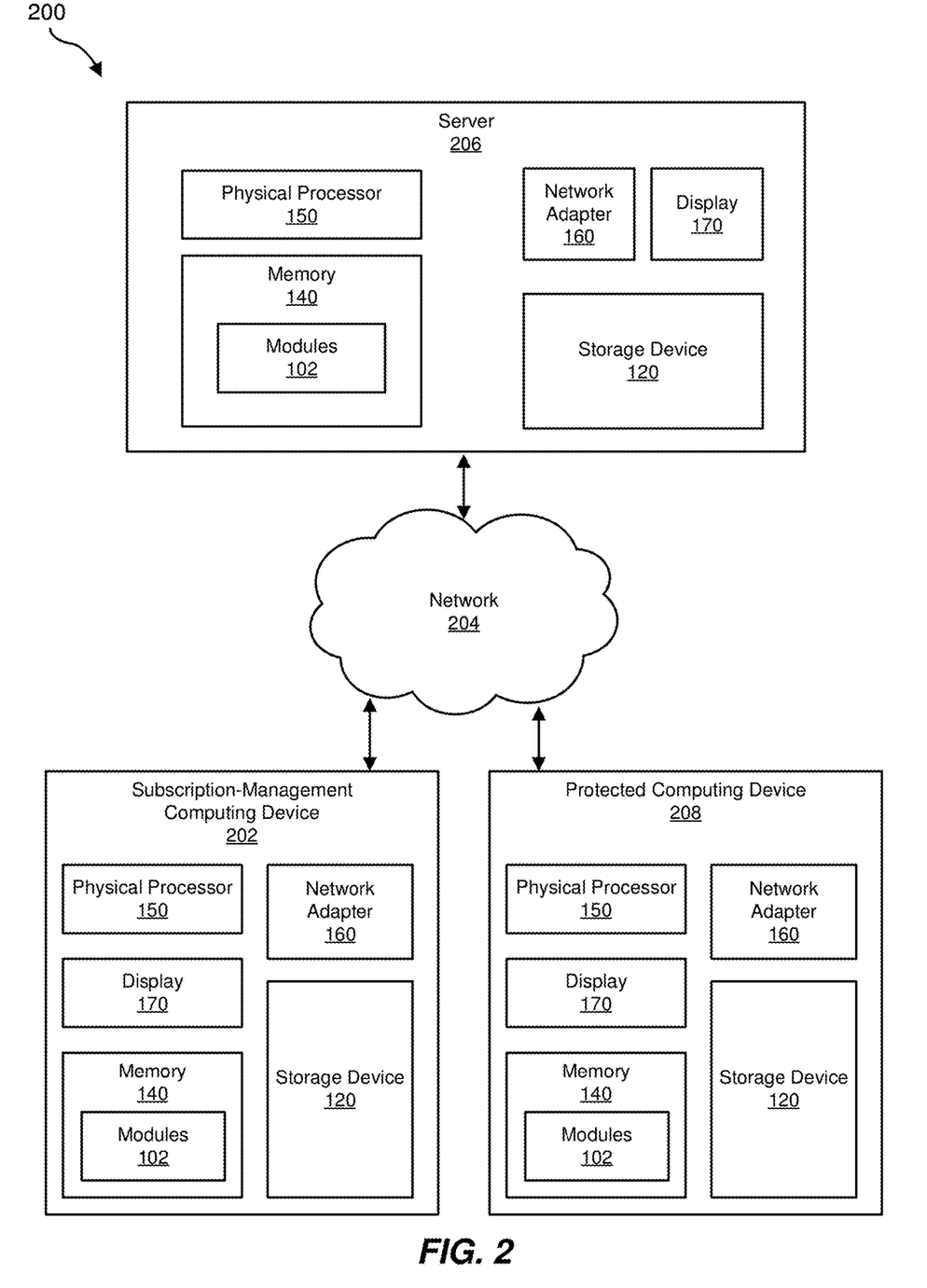
FIG. 2 is a block diagram of an additional example system for increasing cybersecurity protection.
Figure 3:
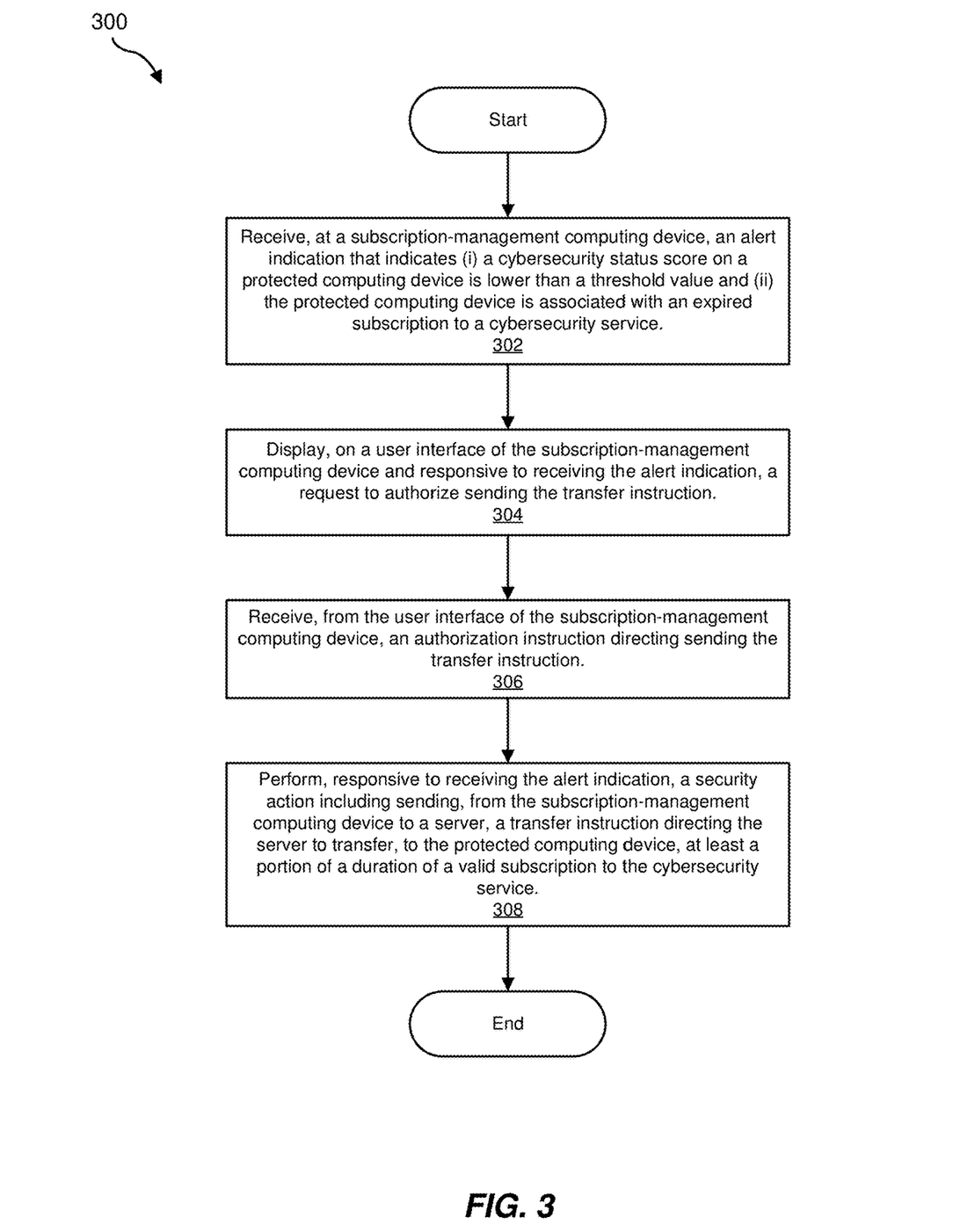
FIG. 3 is a flow diagram of an example method for increasing cybersecurity protection.
Figure 4:
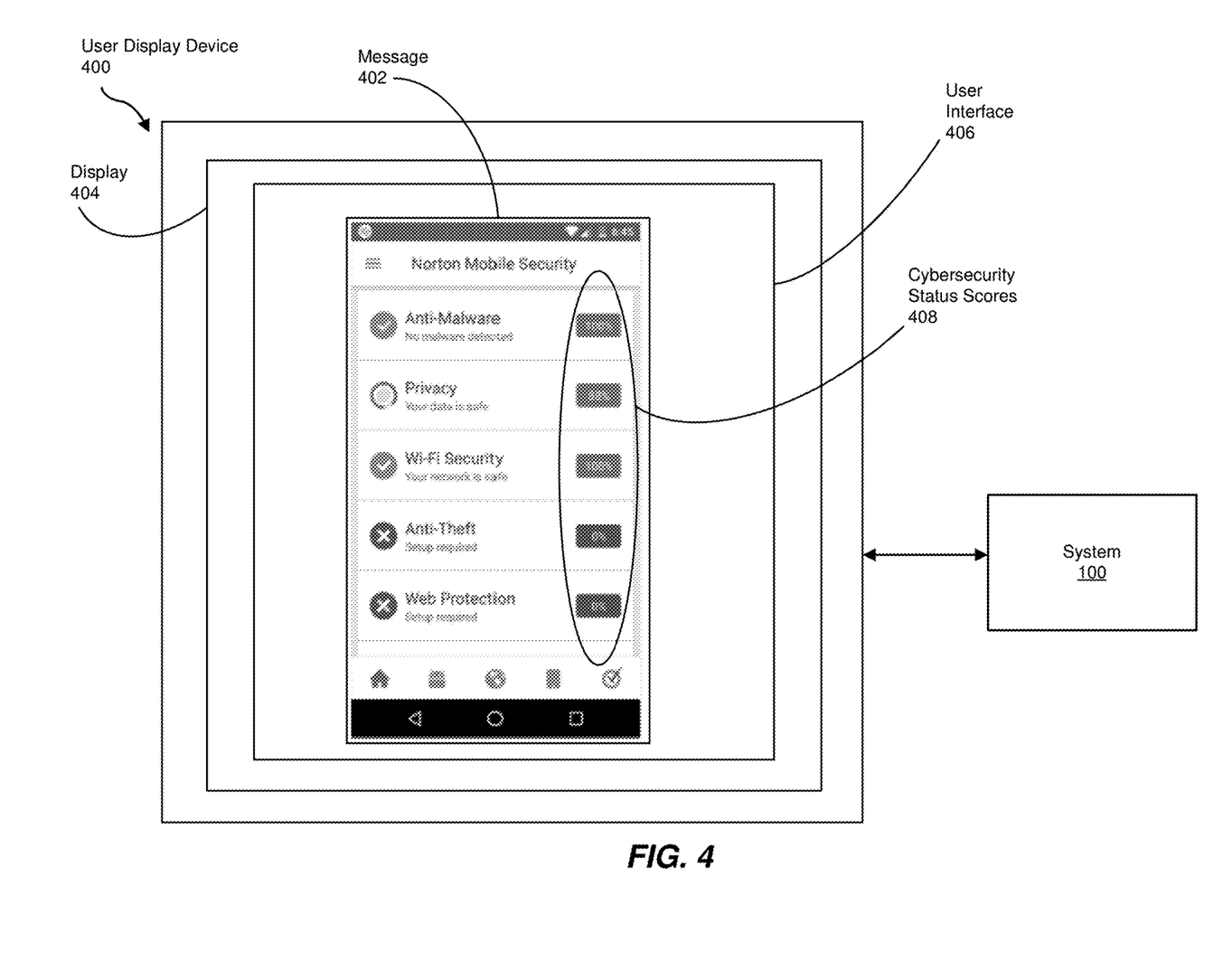
FIG. 4 is a block diagram of an example message on a user display device.

The following will provide, with reference to FIGS. 1-2 and 4, detailed descriptions of example systems for increasing cybersecurity protection. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for increasing cybersecurity protection. As illustrated in this figure, example system 100 may include one or more modules 102 for performing one or more tasks. As will be explained in greater detail below, modules 102 may include a first receiving module 104, a displaying module 106, a second receiving module 108 and/or a performing module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., subscription-management computing device 202, server 206, and/or protected computing device 208). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of characteristics of an alert indication 121, a cybersecurity status score 122, a threshold value 123, an expired subscription 124, a security action 125, a transfer instruction 126, a duration 127, a valid subscription 128, a request to authorize 129, and/or an authorization instruction 130. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

The term "cybersecurity status score," as used herein, generally refers scores (e.g., a number) identifying levels of cybersecurity protection provided to at least one computing device. Non-limiting examples of cybersecurity scores include identity protection scores, on-line safety scores, anti-malware status scores, privacy scores, wi-fi security scores, anti-theft scores, web protection scores, the like, or a combination thereof. In some embodiments, respective cybersecurity status scores 122 may be displayed for different protective features that may be provided by cybersecurity services. In some examples, some cybersecurity services may provide different tiers of protective features such as standard protective features and premium protective features (e.g., anti-malware features).

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 150. Physical processor 150 generally represents any type or form of hardware-implemented processing unit capable of interpreting and/or executing computer-readable instructions. In one example, physical processor 150 may access and/or modify one or more of modules 102 stored in memory 140. Additionally or alternatively, physical processor 150 may execute one or more of modules 102 to facilitate increasing cybersecurity protection. Examples of physical processor 150 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more network adapters, such as network adapter 160. In some examples, network adapter 160 may be a physical network adapter connected to a physical network (e.g., network 204 in FIG. 2).

As illustrated in FIG. 1, example system 100 may also include one or more display devices, such as display 170. Display 170 generally represents any type or form of device capable of visually displaying information (e.g., to a user). In some examples, display 170 may present a graphical user interface (e.g., to enable user interaction with system 100). In non-limiting examples, display 170 may present information indicating one or more of characteristics of at least a portion of alert indication 121, cybersecurity status score 122, threshold value 123, expired subscription 124, security action 125, transfer instruction 126, duration 127, valid subscription 128, request to authorize 129, and/or authorization instruction 130. In some examples, display 170 may be a touchscreen device configured to display a user interface and/or receive user input.

Example system 100 in FIG. 1 may be implemented in a variety of ways. For example, all or a portion of example system 100 may represent portions of example system 200 in FIG. 2. As shown in FIG. 2, system 200 may include a subscription-management computing device 202 in communication with a server 206, and/or a protected computing device 208 via a network 204. In one example, all or a portion of the functionality of modules 102 may be performed by subscription-management computing device 202, server 206, protected computing device 208, and/or any other suitable computing system. As will be described in greater detail below, one or more of modules 102 from FIG. 1 may, when executed by at least one processor of subscription-management computing device 202, server 206, and/or protected computing device 208 enable subscription-management computing device 202, server 206, and/or protected computing device 208 to increase cybersecurity protection (e.g., of protected computing device 208). For example, and as will be described in greater detail below, one or more of modules 102 may cause subscription-management computing device 202, server 206, and/or protected computing device 208 to (i) receive, at subscription-management computing device 202, alert indication 121 that indicates (A) cybersecurity status score 122 on protected computing device 208 is lower than threshold value 123 and (B) protected computing device 208 is associated with expired subscription 124 to a cybersecurity service and (ii) perform, responsive to receiving alert indication 121, security action 125 including sending, from subscription-management computing device 202 to server 206, transfer instruction 126 directing server 206 to transfer, to protected computing device 208, at least a portion of duration 127 of valid subscription 128 to the cybersecurity service.

Subscription-management computing device 202 generally represents any type or form of computing device capable of reading computer-executable instructions. In some examples, computing device 202 may represent a computer running security software, such as cybersecurity software and/or privacy software. Additional examples of subscription-management computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between subscription-management computing device 202, server 206, and/or protected computing device 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that is capable of reading computer-executable instructions. In some examples, server 206 may represent a computer running security software, such as cybersecurity software and/or privacy software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Protected computing device 208 generally represents any type or form of computing device capable of reading computer-executable instructions. In some examples, protected computing device 208 may represent a computer running security software, such as cybersecurity software and/or privacy software. Additional examples of protected computing device 208 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device. In some examples, protected computing device 208 may receive limited cybersecurity protection at some times, such as when a subscription to a cybersecurity protection service previously serving protected computing device 208 is expired. In some examples, protected computing device 208 may receive no cybersecurity protection at some times, such as when a subscription to a cybersecurity protection service previously serving protected computing device 208 is expired. In some embodiments, protected computing device 208 need not receive cybersecurity protection at all times.

FIG. 3 is a flow diagram of an example computer-implemented method 300 for increasing cybersecurity protection. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive (e.g., at subscription-management computing devices) alert indications that indicate (i) cybersecurity status scores on protected computing devices are lower than threshold values and (ii) protected computing devices are associated with expired subscriptions to cybersecurity services. The systems described herein may perform step 302 in a variety of ways. For example, first receiving module 104 may, as part of subscription-management computing device 202 in FIG. 2, receive, at subscription-management computing device 202, alert indication 121 that indicates (i) cybersecurity status score 122 on protected computing device 208 is lower than threshold value 123 and (B) protected computing device 208 is associated with expired subscription 124 to a cybersecurity service.

In some embodiments, the alert indications may be sent from protected computing devices in response to the protected computing devices identifying that cybersecurity status scores on the protected computing devices are lower than the threshold values and/or the protected computing devices are associated with expired subscriptions to cybersecurity services. In some embodiments, when cybersecurity status scores for respective premium-tier protective features on protected computing devices are lower than the threshold values, the protected computing devices may automatically issue the alert indications. In an embodiment, protected computing devices may receive and/or implement configuration settings that disable sending alert indications when cybersecurity status scores for respective premium-tier protective features on protected computing devices are lower than the threshold values. In an example, when cybersecurity status scores for respective standard-tier protective features on protected computing devices are lower than the threshold values, the protected computing devices may automatically issue the alert indications. In an embodiment, protected computing devices may receive and/or implement configuration settings that disable sending alert indications when cybersecurity status scores for respective standard-tier protective features on protected computing devices are lower than the threshold values.

We turn now to FIG. 4.

FIG. 4 depicts an example of a user display device 400 including display 404 (e.g., display 170) which may present user interface 406. In this example, user display device 400 may display cybersecurity-related message 402. In some examples, cybersecurity-related message 402 may include at least one cybersecurity status score 408 (e.g., cybersecurity status score 122). In some embodiments, respective cybersecurity status scores 408 may be displayed for different protective features that may be provided by a cybersecurity service. In some examples, cybersecurity status score 408 may include an identity protection score, an on-line safety score, an anti-malware status score, a privacy score, a wi-fi security score, an anti-theft score, a web protection score, the like, or a combination thereof. In some examples, user display device 400 may be integrated with system 100 in the same device, such as a mobile device. Cybersecurity status score examples depicted in FIG. 4 and described hereby are not limiting.

We now return to FIG. 3.

As illustrated in FIG. 3, at step 304 one or more of the systems described herein may display (e.g., on user interfaces on displays of the subscription-management computing devices) responsive to receiving alert indications, requests to authorize sending transfer instructions. The systems described herein may perform step 304 in a variety of ways. For example, displaying module 106 may, as part of subscription-management computing device 202 in FIG. 2, display on a user interface on display 170 of subscription-management computing device 202 and responsive to receiving alert indication 121, request to authorize 129 sending transfer instruction 126. In some examples, step 304 is optional.

In an example, one or more of the systems described herein may display (e.g., on user interfaces on displays of the subscription-management computing devices) requests to authorize sending transfer instructions, where the requests are made in response to (i) meeting and/or exceeding predetermined periods of inactivity of subscription-management computing devices and (ii) protected computing devices being associated with (A) expired subscriptions to cybersecurity services and/or (B) valid subscriptions to cybersecurity services that expire within a predetermined period of time (e.g., the subscriptions are about to expire). In some examples, periods of inactivity of subscription-management computing devices may be identified by tracking times of receiving touchscreen sensor inputs and comparing predetermined time durations to differences between (i) the times of receiving the touchscreen sensor inputs and (ii) present times. In some examples, one or more of the systems described herein may display (e.g., on user interfaces on displays of the subscription-management computing devices), in absences of cybersecurity scores, requests to authorize sending transfer instructions.

As illustrated in FIG. 3, at step 306 one or more of the systems described herein may receive, from the user interfaces of the subscription-management computing devices, authorization instructions directing sending transfer instructions. The systems described herein may perform step 306 in a variety of ways. For example, second receiving module 108 may, as part of subscription-management computing device 202 in FIG. 2, receive, from the user interface of the subscription-management computing device 202, authorization instruction 130 directing sending transfer instruction 126. In some examples, step 306 is optional.

In some examples, one or more of the systems described herein may perform security actions in response to receiving the authorization instructions.

As illustrated in FIG. 3, at step 308 one or more of the systems described herein may perform, responsive to receiving the alert indications, security actions. In some examples, the security actions may include sending, from the subscription-management computing devices to servers, transfer instructions directing the servers to transfer, to the protected computing devices, at least portions of durations of valid subscriptions to the cybersecurity services. The systems described herein may perform step 308 in a variety of ways. For example, performing module 110 may, as part of subscription-management computing device 202 in FIG. 2, perform responsive to receiving alert indication 121, security action 125 including sending, from subscription-management computing device 202 to server 206, transfer instruction 126 directing server 206 to transfer, to protected computing device 208, at least a portion of duration 127 of valid subscription 128 to the cybersecurity service.

In some examples, duration 127 may be in units of time such as, and not limited to, years, months, weeks, days, hours, minutes, and/or seconds. In some examples, different portions of duration 127 may be transferred to different computing devices. In examples, the at least portions of durations of valid subscriptions to the cybersecurity services may be predetermined units of time and/or a unit of time identified by user inputs. In some examples, the transfer instructions may describe numbers of days, remaining in the valid subscriptions, to transfer to the protected computing devices. In one example, transfer instruction 126 may describe a number of days, remaining on valid subscription 128, to transfer to protected computing device 208.

In some examples, method 300 may include performing security actions automatically in response to receiving alert indications. In one example, method 300 may include performing security action 125 automatically in response to receiving alert indication 121.

In some examples, methods may include displaying, via a user interface on a display device, a number of days remaining in a valid subscription to the cybersecurity service. In some examples, methods may include displaying a request to transfer at least a portion of a duration of the valid subscription to another computing device. In some examples, method 300 may include receiving a user request to transfer the at least the portion of the duration of the valid subscription to another computing device and, in response, sending, from a subscription-management computing device to a server, a transfer instruction directing the server to transfer, to the other computing device, at least the portion of the duration of the valid subscription to the cybersecurity service.

In some examples, security action 125 may include blocking access to devices (e.g., storage devices, memories, network devices, etc.), allowing limited access to devices, allowing read-only access to devices, encrypting information, and/or other acts limiting access to devices. In some examples, security action 125 may be performed automatically. In some embodiments, security action 125 may attempt to identify and/or ameliorate potential security risks. In some examples, security action 125 many include blocking access to and/or by executing processes. In additional examples, security action 125 may include displaying, on user displays, warnings indicating that processes may be potentially dangerous.

In some examples, method 300 may include limiting numbers of repetitions of sending transfer instructions (e.g., transfer instruction 126) to specified maximum quantities. In some non-limiting examples, the maximum number of transfers per valid subscription may be a quantity between one and five, inclusive. In an embodiment, method 300 may include displaying requests on user interfaces of subscription-management computing devices to renew the expired subscriptions to the cybersecurity services associated with the protected computing devices. In one example, the displaying the requests on the user interfaces of the subscription-management computing devices to renew the expired subscriptions to the cybersecurity services associated with the protected computing devices may be responsive to the number of transfer instructions equaling or surpassing the specified maximum quantities. In an example, method 300 may include displaying on display 170, responsive to a number of transfer instructions 126 equaling or surpassing the specified maximum quantity, a request on a user interface of subscription-management computing device 202 to renew expired subscription 124 to the cybersecurity service associated with protected computing device 208. In some embodiments, a number of remaining transfers may be displayed via a user interface on a display device.

In some examples, users may transfer possession of protected computing devices. Thus, in some embodiments, method 300 may include performing the security action in response to the protected computing device being within range of a wireless transmitter of the subscription-management computing device. In one example, method 300 may include performing security action 125 in response to protected computing device 208 being within range of a wireless transmitter of subscription-management computing device 202.

In some examples, multiple protected computing devices may send alert indications substantially simultaneously, triggering decisions as to which protected computing devices should receive priority consideration when transferring at least portions of durations of valid subscriptions to the cybersecurity services. In some examples, subscription-management computing devices may maintain lists of protected computing devices that may be eligible to receive transfers of at least portions of durations of valid subscriptions to the cybersecurity services. Protected computing devices on the lists may be ranked (i.e., prioritized) based on factors such as frequency of use, age, ownership, geographical location, user-provided priority lists, default priority lists, the like, or a combination thereof. In some examples, the lists may be stored to, stored in, and/or retrieved from cloud-based storage devices.

In some examples, computing devices to which at least the portions of the durations of the valid subscriptions are to be transferred may not have the cybersecurity services installed prior to the transfer. Thus, in some examples, transfer instructions may direct servers to send tokens to protected computing devices to enable the protected computing devices to download the cybersecurity services. In one example, transfer instruction 126 may direct server 206 to send a token to protected computing device 208 to enable protected computing device 208 to download the cybersecurity service.

In an embodiment, method 300 may include displaying, responsive to receiving the alert indications and on user interfaces of the subscription-management computing devices, requests to renew the expired subscriptions of the protected computing devices. In an example, method 300 may include displaying (e.g., on display 170), responsive to receiving alert indication 121 and on a user interface of subscription-management computing device 202, a request to renew expired subscription 124 of protected computing device 208. In some examples, method 300 may include receiving inputs directing renewal of expired subscriptions (e.g., expired subscription 124). In some examples, renewing expired subscriptions may reactivate expired subscriptions, thus enabling cybersecurity protection of computing devices (e.g., protected computing device 208).

In some embodiment, method 300 may include displaying, responsive to receiving the alert indications and on user interfaces of the subscription-management computing device, requests to renew the valid subscriptions. In one example, method 300 may include displaying (e.g., on display 170), responsive to receiving alert indication 121 and on a user interface of subscription-management computing device 202, a request to renew valid subscription 128. In some examples, method 300 may include receiving inputs directing renewal of valid subscriptions (e.g., valid subscription 128). In some examples, renewing valid subscriptions may extend respective durations of the valid subscriptions.

In some embodiments, method 300 may include (i) receiving, at the servers, the transfer instructions and (ii) sending, from the servers to the protected computing devices and responsive to the transfer instructions, information enabling the protected computing devices to use the durations of the valid subscriptions to the cybersecurity services. In some embodiments, method 300 may include (i) receiving, at server 206, transfer instruction 126 and (ii) sending, from server 206 to protected computing device 208 and responsive to transfer instruction 126, information enabling protected computing device 208 to use duration 127 of the valid subscription 128 to the cybersecurity service.

In some examples, method 300 may include (i) receiving, at the protected computing devices, the information enabling the protected computing devices to use the at least the portions of the durations of the valid subscriptions to the cybersecurity services and (ii) providing, using the cybersecurity services and responsive to the receiving the information enabling the protected computing devices to use the at least the portions of the durations of the valid subscriptions to the cybersecurity service, the protected computing devices with cybersecurity protection. In some examples, method 300 may include (i) receiving, at protected computing device 208, the information enabling protected computing device 208 to use the at least the portion of duration 127 of valid subscription 128 to the cybersecurity service and (ii) providing, using the cybersecurity service and responsive to the receiving the information enabling protected computing device 208 to use the at least the portion of duration 127 of valid subscription 128 to the cybersecurity service, protected computing device 208 with cybersecurity protection.

In one example, the at least the portions of the durations of the valid subscriptions may be manually transferred from the protected computing device to the subscription-management computing devices. In some embodiments, the protected computing devices and/or the subscription-management computing devices may receive user inputs directing the protected computing devices and/or the subscription-management computing devices to transfer the at least the portions of the durations of the valid subscriptions to the cybersecurity service to computing devices from which the at least the portions of the durations of the valid subscriptions to the cybersecurity service were previously transferred.

In one example, the at least the portions of the durations of the valid subscriptions may be automatically transferred from the protected computing devices to the subscription-management computing devices, such as when cybersecurity status scores on subscription-management computing devices are lower than a threshold value and the subscription-management computing devices are associated with expired subscriptions to cybersecurity services. The protected computing devices may perform at least portions of security actions as described hereby to initiate the transfer.

As detailed above, the steps outlined in method 300 in FIG. 3 may enable computing devices to increase cybersecurity protection. In some examples the systems described herein may enable automatically transferring at least a portion of a duration of a valid subscription to cybersecurity protection from a subscription-management computing device to a protected computing device based on cybersecurity status of the protected computing device. In some examples the systems described herein may enable manually transferring at least a portion of a duration of a valid subscription to cybersecurity protection from a subscription-management computing device to a protected computing device based on cybersecurity status of the protected computing device.

Figure 5:
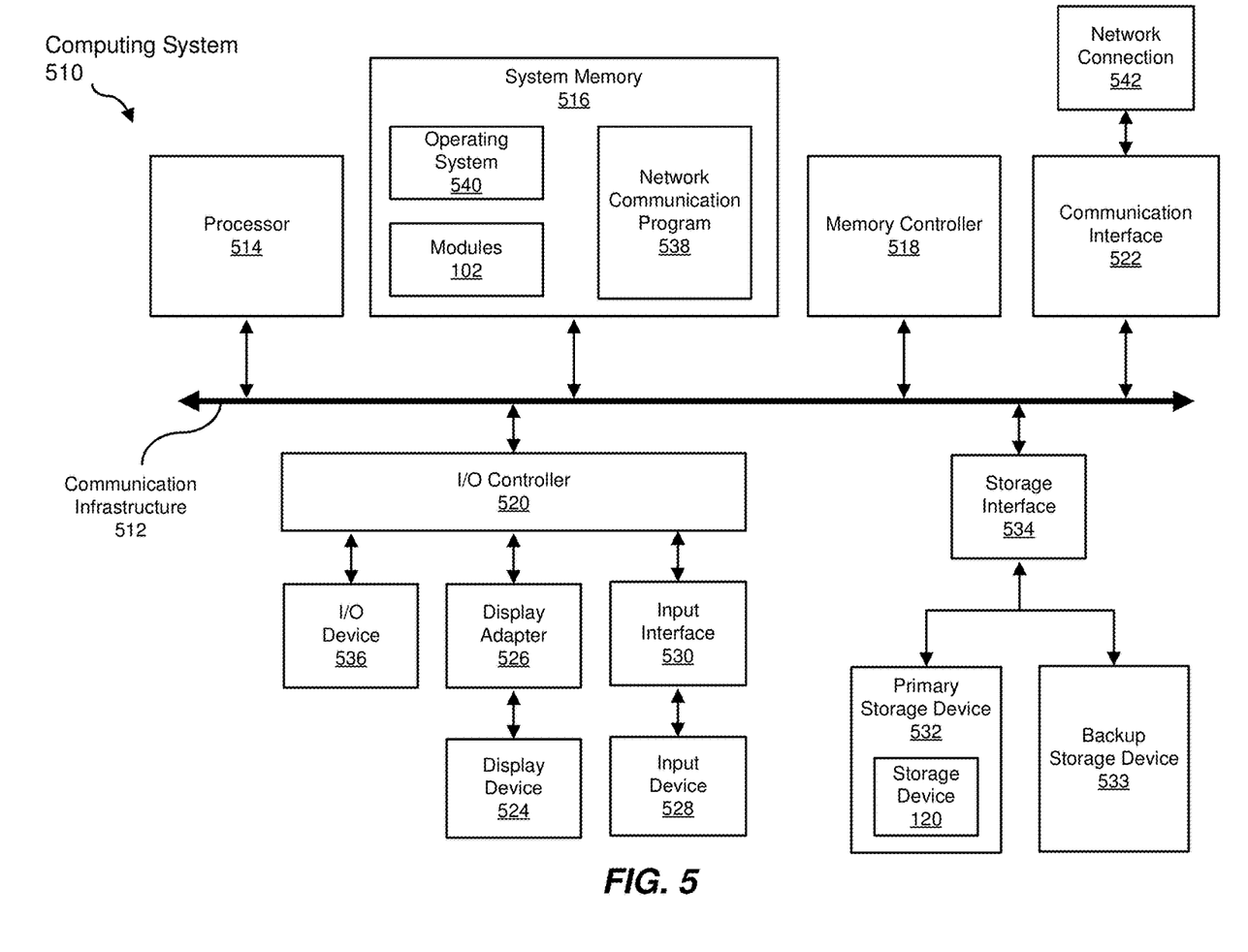
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, storage device 120 from FIG. 1 may be at least a portion of primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
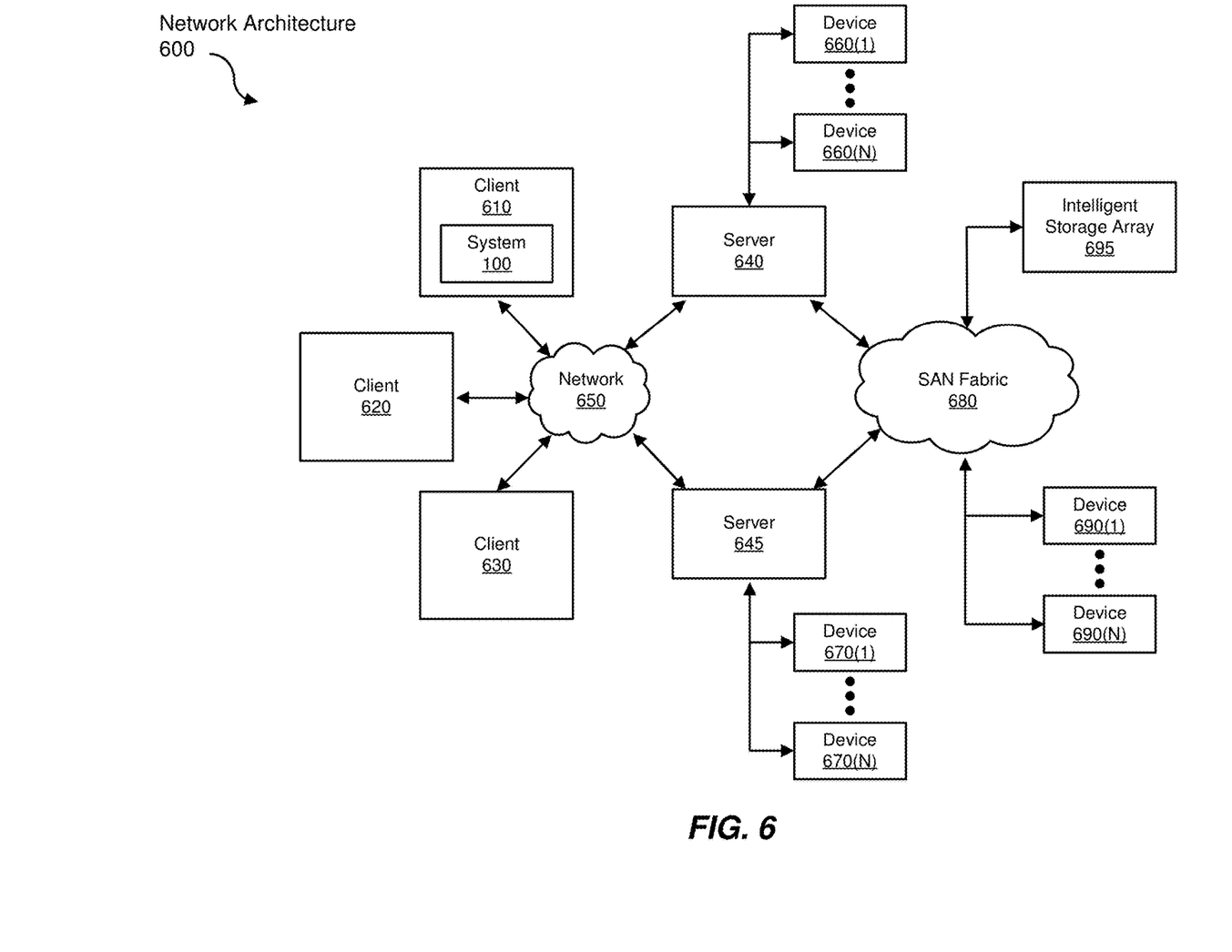
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for increasing cybersecurity protection.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, cybersecurity systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive digital information (e.g., an alert indication) to be transformed, transform the digital information, output a result of the transformation to a user display, use the result of the transformation to initiate a security action, and/or store the result of the transformation to a digital information storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for increasing cybersecurity protection, at least a portion of the method being performed by a subscription-management computing device comprising at least one processor, the method comprising:

receiving, at the subscription-management computing device and from a protected computing device, an alert indication that indicates:

a cybersecurity status score identifying a level of cybersecurity protection provided to the protected computing device by at least one protected feature provided by a cybersecurity service on the protected computing device is lower than a threshold value; and the protected computing device is associated with an expired subscription to the cybersecurity service;

determining, responsive to receiving the alert indication, that:

the cybersecurity service is no longer providing the protected computing device with the cybersecurity protection for the at least one protected feature based on the protected computing device being associated with the expired subscription to the cybersecurity service; and the protected computing device is eligible to receive a transfer of at least a portion of a duration of a valid subscription to the cybersecurity service based on the cybersecurity status score for the at least one protected feature being below the threshold value; and performing, responsive to determining that the protected computing device is eligible to receive the transfer of the at least a portion of a duration of a valid subscription to the cybersecurity service, a security action comprising sending, from the subscription-management computing device to a server, a transfer instruction directing the server to transfer, to the protected computing device, the at least a portion of the duration of the valid subscription to the cybersecurity service.

2. The method of claim 1, further comprising performing the security action automatically in response to receiving the alert indication.

3. The method of claim 1, further comprising:
displaying, on a user interface of the subscription-management computing device and responsive to receiving the alert indication, a request to authorize sending the transfer instruction; and
receiving, from the user interface of the subscription-management computing device, an authorization instruction directing sending the transfer instruction.

4. The method of claim 1, further comprising limiting a number of repetitions of sending the transfer instruction to a specified maximum quantity.

5. The method of claim 4, further comprising displaying, responsive to the number of transfer instructions equaling or surpassing the specified maximum quantity, a request on a user interface of the subscription-management computing device to renew the expired subscription to the cybersecurity service associated with the protected computing device.

6. The method of claim 1, wherein the transfer instruction describes a number of days, remaining in the valid subscription, to transfer to the protected computing device.

7. The method of claim 1, further comprising performing the security action in response to the protected computing device being within range of a wireless transmitter of the subscription-management computing device.

8. The method of claim 1, wherein the transfer instruction directs the server to send a token to the protected computing device to enable the protected computing device to download the cybersecurity service.

9. The method of claim 1, further comprising displaying, responsive to receiving the alert indication and on a user interface of the subscription-management computing device, a request to renew the expired subscription of the protected computing device.

10. The method of claim 1, further comprising displaying, responsive to receiving the alert indication and on a user interface of the subscription-management computing device, a request to renew the valid subscription.

11. The method of claim 1, wherein the transfer instruction directs the server to send, to the protected computing device, information enabling the protected computing device to use the duration of the valid subscription to the cybersecurity service.

12. The method of claim 11, wherein enabling the protected computing device to use the duration of the valid subscription to the cybersecurity service comprises providing the protected computing device with cybersecurity protection.

13. A system for increasing cybersecurity protection, the system comprising:
a subscription-management computing device comprising at least one physical processor; and
physical memory comprising computer-executable instructions that, when executed by the physical processor, cause the physical processor to:
receive, at the subscription-management computing device and from a protected computing device, an alert indication that indicates:
a cybersecurity status score identifying a level of cybersecurity protection provided to the protected computing device by at least one protected feature provided by a cybersecurity service on the protected computing device is lower than a threshold value; and
the protected computing device is associated with an expired subscription to the cybersecurity service;
determine, responsive to receiving the alert indication, that:
the cybersecurity service is no longer providing the protected computing device with the cybersecurity protection for the at least one protected feature based on the protected computing device being associated with the expired subscription to the cybersecurity service; and
the protected computing device is eligible to receive a transfer of at least a portion of a duration of a valid subscription to the cybersecurity service based on the cybersecurity status score for the at least one protected feature being below the threshold value; and
perform, responsive to determining that the protected computing device is eligible to receive the transfer of the at least a portion of a duration of a valid subscription to the cybersecurity service, a security action comprising sending, from the subscription-management computing device to a server, a transfer instruction directing the server to transfer, to the protected computing device, the at least a portion of the duration of the valid subscription to the cybersecurity service.

14. The system of claim 13, further comprising computer-executable instructions that, when executed by the physical processor, cause the physical processor to:
display, on a user interface of the subscription-management computing device and responsive to receiving the alert indication, a request to authorize sending the transfer instruction; and
receive, from the user interface of the subscription-management computing device, an authorization instruction directing sending the transfer instruction.

15. The system of claim 13, further comprising computer-executable instructions that, when executed by the physical processor, cause the physical processor to limit a number of repetitions of sending the transfer instruction to a specified maximum quantity.

16. The system of claim 13, wherein the transfer instruction describes a number of days, remaining in the valid subscription, to transfer to the protected computing device.

17. A non-transitory computer-readable medium comprising one or more computer-executable instructions that, when executed by at least one processor of a subscription-management computing device, cause the subscription-management computing device to:
receive, at the subscription-management computing device and from a protected computing device, an alert indication that indicates:
a cybersecurity status score identifying a level of cybersecurity protection provided to the protected computing device by at least one protected feature provided by a cybersecurity service on the protected computing device is lower than a threshold value; and
the protected computing device is associated with an expired subscription to the cybersecurity service;
determine, responsive to receiving the alert indication, that:
the cybersecurity service is no longer providing the protected computing device with the cybersecurity protection for the at least one protected feature based on the protected computing device being associated with the expired subscription to the cybersecurity service; and the protected computing device is eligible to receive a transfer of at least a portion of a duration of a valid subscription to the cybersecurity service based on the cybersecurity status score for the at least one protected feature being below the threshold value; and perform, responsive to determining that the protected computing device is eligible to receive the transfer of the at least a portion of a duration of a valid subscription to the cybersecurity service, a security action comprising sending, from the subscription-management computing device to a server, a transfer instruction directing the server to transfer, to the protected computing device, the at least a portion of the duration of the valid subscription to the cybersecurity service.

18. The non-transitory computer-readable medium of claim 17, further comprising one or more computer-executable instructions that, when executed by the at least one processor of the subscription-management computing device, cause the subscription-management computing device to:

display, on a user interface of the subscription-management computing device and responsive to receiving the alert indication, a request to authorize sending the transfer instruction; and receive, from the user interface of the subscription-management computing device, an authorization instruction directing sending the transfer instruction.

19. The non-transitory computer-readable medium of claim 17, further comprising one or more computer-executable instructions that, when executed by the at least one processor of the subscription-management computing device, cause the subscription-management computing device to limit a number of repetitions of sending the transfer instruction to a specified maximum quantity.

20. The non-transitory computer-readable medium of claim 17, wherein the transfer instruction describes a number of days, remaining in the valid subscription, to transfer to the protected computing device.

* * * * *